(12) United States Patent
Emery et al.

(10) Patent No.: US 6,482,304 B1
(45) Date of Patent: Nov. 19, 2002

(54) APPARATUS AND METHOD OF RECIRCULATING ELECTRODEIONIZATION

(75) Inventors: Nigel Emery, Wycombe (GB); Roger Woodward, Wycombe (GB); Paul Whitehead, Mill Lane (GB)

(73) Assignee: OTV Societe Anonyme, St. Maurice (FR)

( * ) Notice: Subject to any disclaimer, the term of this patent is extended or adjusted under 35 U.S.C. 154(b) by 0 days.

(21) Appl. No.: 09/720,350

(22) PCT Filed: May 3, 2000

(86) PCT No.: PCT/US00/11936
§ 371 (c)(1),
(2), (4) Date: Apr. 5, 2001

(87) PCT Pub. No.: WO00/67906
PCT Pub. Date: Nov. 16, 2000

(30) Foreign Application Priority Data

May 7, 1999 (GB) .............................................. 9910550

(51) Int. Cl.[7] .............................................. B01D 61/48
(52) U.S. Cl. ...................... 204/524; 204/533; 204/536; 204/632; 204/634
(58) Field of Search ................. 204/524, 533, 204/536, 632, 634

(56) References Cited

U.S. PATENT DOCUMENTS 4,687,561 A 8/1987 Kunz ..................... 204/182.5
5,858,191 A * 1/1999 DiMascio et al. .......... 204/524

FOREIGN PATENT DOCUMENTS

| EP | 0 170 895 | 2/1986 |
| GB | 2311999 A | 10/1997 |
| WO | WO 98/51620 | 11/1998 |

* cited by examiner

Primary Examiner—Arun S. Phasge
(74) Attorney, Agent, or Firm—Wolf, Greenfield&Sacks, P.C.

(57) ABSTRACT

An electrodeionisation apparatus comprising a first deionising flow path and an integral second deionising flow path is described. The outflow from the first path is held in a holding tank prior to passage through the second flow path, and the outflow from the second path is available for use. Optionally, the second path outflow is partly or fully returned to the holding tank. Me recirculation of the already purified water in the holding tank maintains the water in the holding tank at a higher standard than otherwise "standing" purified water. The water in the holding tank could be separately made available for use. The apparatus requires the use of only a single pair of electrodes and hence one power supply. Moreover, the ion exchange materials in the first deionising flow path can be regenerated when water is not flowing through them such that they have a greater capacity for deionisation when required.

34 Claims, 3 Drawing Sheets

APPARATUS AND METHOD OF RECIRCULATING ELECTRODEIONIZATION

RELATED APPLICATIONS

This application claims the benefit under 35 U.S.C. §120 or 35 U.S.C. §365(c) of PCT International application PCT/US00/11936 designating the United States of America, and filed May 3, 2000, of which this application is a national stage filing under 35 U.S.C. §371, was published under PCT Article 21(2) in English.

Foreign priority benefits are claimed under 35 U.S.C. §119(a)–(d) or 35 U.S.C. §365(b) of Great Britain application number 9910550.4 filed May 7, 1999, which designated at least one country other than the United States.

The present invention relates to an apparatus for a method of recirculating electrodeionisation involving improved purification of purified water.

Apparatus and methods for electrodialysis to provide purified water are well known, see for example our GB-A-2311999 and U.S. Pat. No. 4687561. Generally, water to be purified is passed along a deionising path set between or along an anode and a cathode. The application of a potential difference between the anode and cathode causes anions and cations in the impure water to migrate towards their respective attracting electrodes through perm-selective membranes. A concentrating path is arranged therewith to collect and remove the unwanted anions and cations.

The purified outflow water from such apparatus is then available for use. However, the general rates of flow of water through such apparatus do not allow a significant volume of purified water to be available for use quickly. The alternative is to collect the purified outflow water in a holding tank, from which a larger volume of water could be drawn when desired. However, water held in a tank, especially that at high purities such as <0.1 $\mu$S/cm, absorbs impurities from the environment, such as carbon dioxide from the atmosphere thus increasing its conductivity.

It is an object of the present invention to provide an electrodeionisation method and apparatus which is capable of providing a volume of water of a high ionic purity ready for use when desired.

Thus, according to one aspect of the present invention, there is provided an electrodeionisation apparatus comprising a first deionising flow path for water to be purified through an anion exchange material and/or a cation exchange material, in either order where both materials are used, and an integral second deionising flow path through an anion exchange material and a cation exchange material, in either order, wherein the outflow from the first path is held in a holding tank prior to passage through the second flow path, and the outflow from the second path is available for use.

Optionally, part or all of the second path outflow could be returned to the holding tank, e.g. when not required for use.

The recirculation of the already purified water in the holding tank maintains the water in the holding tank at a higher standard than otherwise 'standing' purified water.

Outflow from the second path may be passed around a ringmain with one of more take-off points before any remaining water is returned to the tank.

In one embodiment of the present invention, purified water held in the holding tank could be separately made available for use. Thus, the present invention could provide for the provision of purified water from the holding tank directly, and/or of further purified water available directly from the outflow of the second deionising flow path. Water from the outflow of the second deionising flow path will usually be at a higher purity than water in the holding tank.

The holding tank may, and generally will, however hold a relatively substantially volume of purified water, all of which is immediately available for use, whilst the time for collection of direct further purified water from the outlet of the second deionising flow path is dependent on the flow rate therefrom.

Preferably, the anion exchange material is an anion exchange resin, and the cation exchange material is a cation exchange resin. Also preferably, the exchange materials are held in separated chambers.

Preferably, the first deionising flow path involves both an anion exchange material and a cation exchange material in either order.

If necessary or desired, the anode and/or cathode could be housed within chambers housing the anion and/or cation exchange materials. Preferably, the anode and/or cathode are housed in chambers separate from the first and second deionising flow paths.

In an alternative arrangement, the anode and/or cathode are not separate from either the first and/or second deionising flow paths.

In another embodiment of the present invention, the chamber for the anion exchange material of the first deionising flow path is adjacent the chamber for the anion exchange material for the second deionising flow path, and the chamber for the cation exchange material of the first deionising flow path is adjacent the chamber for the cation exchange material for the second deionising flow path.

Preferably, the water to be purified or further purified passes through an anion exchange material first, followed by passage through a cation exchange material.

The apparatus also preferably includes a concentrating chamber into which the anions and cations desired to be removed from the water are concentrated and removed from the electrodeionisation apparatus. The apparatus could include a concentrating chamber adjacent each anion and/or cation exchange material chamber. Preferably, the apparatus includes at least a centrally arranged concentrating chamber.

Also preferably, at least one of the or any anode chambers, cathode chambers, and concentrating chambers has a flushing stream passing therethrough to remove electrode gases and/or the unwanted ions. Purified and repurified water from the first and/or second flow paths could be used for the or each flushing stream. Such water could be passed successively through two or more of the anode chamber(s), cathode chamber(s) and/or concentrating chambers(s). Preferably the flushing stream runs countercurrent to the water flow through the, or at least one of, the adjacent purified water chambers.

According to a preferred embodiment of the present invention, the electrodeionisation apparatus is a stack comprising seven chambers, a first chamber housing an anode, a second chamber containing cation exchange material for the second deionisation flow path, a third chamber housing cation exchange material for the first deionising flow path, a fourth chamber being a central concentrating chamber, a fifth chamber housing anion exchange material for the first deionising flow path, a sixth chamber housing anion exchange material for the second deionising flow path, and a final seventh chamber housing a cathode.

The chambers housing the anode and/or cathode may contain also one or more conducting materials. These may be cation exchange material in the anode chamber and anion exchange material in the cathode chamber.

The chambers can be separated by relevant perm-selective membranes as known to those skilled in the art. Any piping required for the deionising flow paths between the various exchange materials and/or chambers is also well known in the art.

According to a second aspect of the present invention, there is provided a method of providing purified water wherein water to be purified is passed through a first deionising flow path followed by a passage through a second deionising flow path, wherein the outflow from the first path is held in a holding tank prior to passage through the second flow path, and wherein the outflow from the second path is available for use. Optionally, such outflow is partly or fully returned to the holding tank.

The method of the present invention could use deionisation apparatus as described above, and preferably includes the water in the holding tank being available for use also.

Thus, according to a third aspect of the present invention there is provided apparatus for providing a volume of purified water available immediately for use, comprising a first deionising flow path for water to be purified through an anion exchange material and/or a cation exchange material, in either order where both materials are used, and an integral second deionising flow path through an anion exchange material and a cation exchange material, in either order, wherein the outflow from the first path is held in a holding tank adapted to hold the volume of purified water, and wherein water in the holding tank is intermittently or continuously circulated through the second flow path and wholly or partly returned to the holding tank.

The further purity of the outflow from the second deionising flow path, which has higher purity than water in the holding tank, inherently maintains or improves the purity of the water in the holding tank when mixed therewith.

According to a fourth aspect of the present invention, there is provided a method of providing a volume of purified water immediately available for use, wherein the water to be purified is passed through a first deionising flow path and held in a holding tank from which it is available for use, and wherein water in the holding tank is intermittently or continuously circulated through the second flow path and returned to the holding tank.

The volume of the water in the holding tank is preferably substantially more than that directly available from the second path outflow over a reasonably short period of time.

The apparatus of the present invention may be of any suitable size and dimension. The principles of the present invention apply equally to small or large scale apparatus.

An embodiment of the present invention will now be described by way of example only and with reference to the accompanying drawings, in which.

Figure 1:
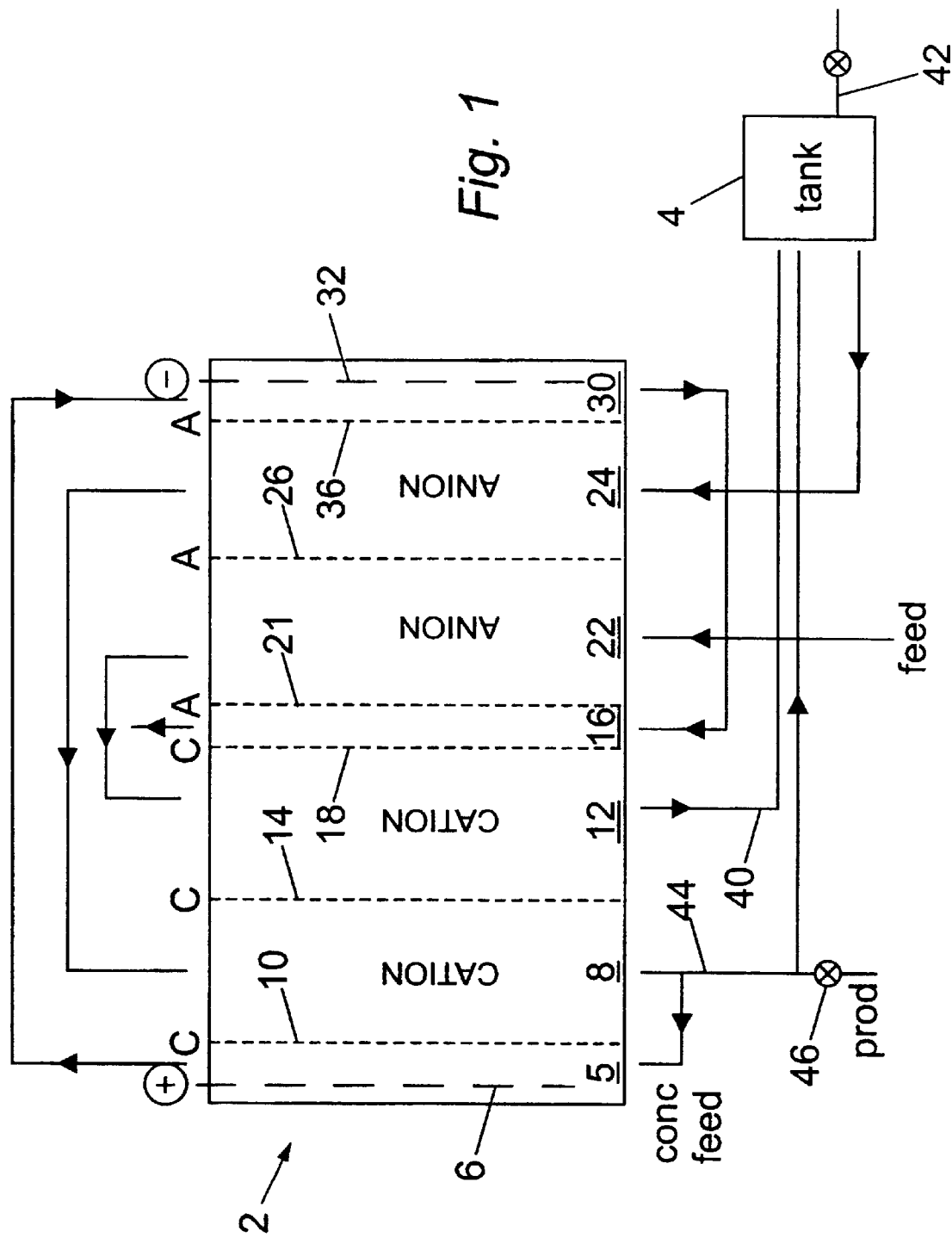
FIG. 1 is a schematic cross-sectional side view of apparatus according to the present invention.

Referring to the drawings, FIG. 1 shows an electrodeionisation apparatus having a stack (2) and a holding tank (4). The stack (2) has seven chambers. The first chamber (5) houses an anode (6), and preferably contain cation exchange material (7). The second chamber (8) houses a cation exchange material (9), and is separated from the first chamber (5) by a cation selective membrane (10). Next to the second chamber (8) lies a third chamber (12) housing cation exchange material (13) also. The third chamber (12) is separated from the second chamber (8) by a cation exchange membrane (14). Next to the third chamber (12) is a fourth chamber (16) acting as a concentrating chamber for collection and removal of undesired ions. Between the third and fourth chambers (12,16) lies a cation exchange membrane (18). The fourth concentrating chamber may also contain ion exchange material (20).

The fourth concentrating chamber (16) is bound on its other side by anion exchange membrane (21), next to which is a fifth chamber (22) housing anion exchange material (23). Next to the fifth chamber (22) is a sixth chamber (24), separated by another anion exchange membrane (26). The sixth chamber (24) also houses an anion exchange material (28). The final seventh chamber (30) houses a cathode (32), and may also house an anion exchange material (34), between which and the sixth chamber (24) is an anion exchange membrane (36).

Figure 2:
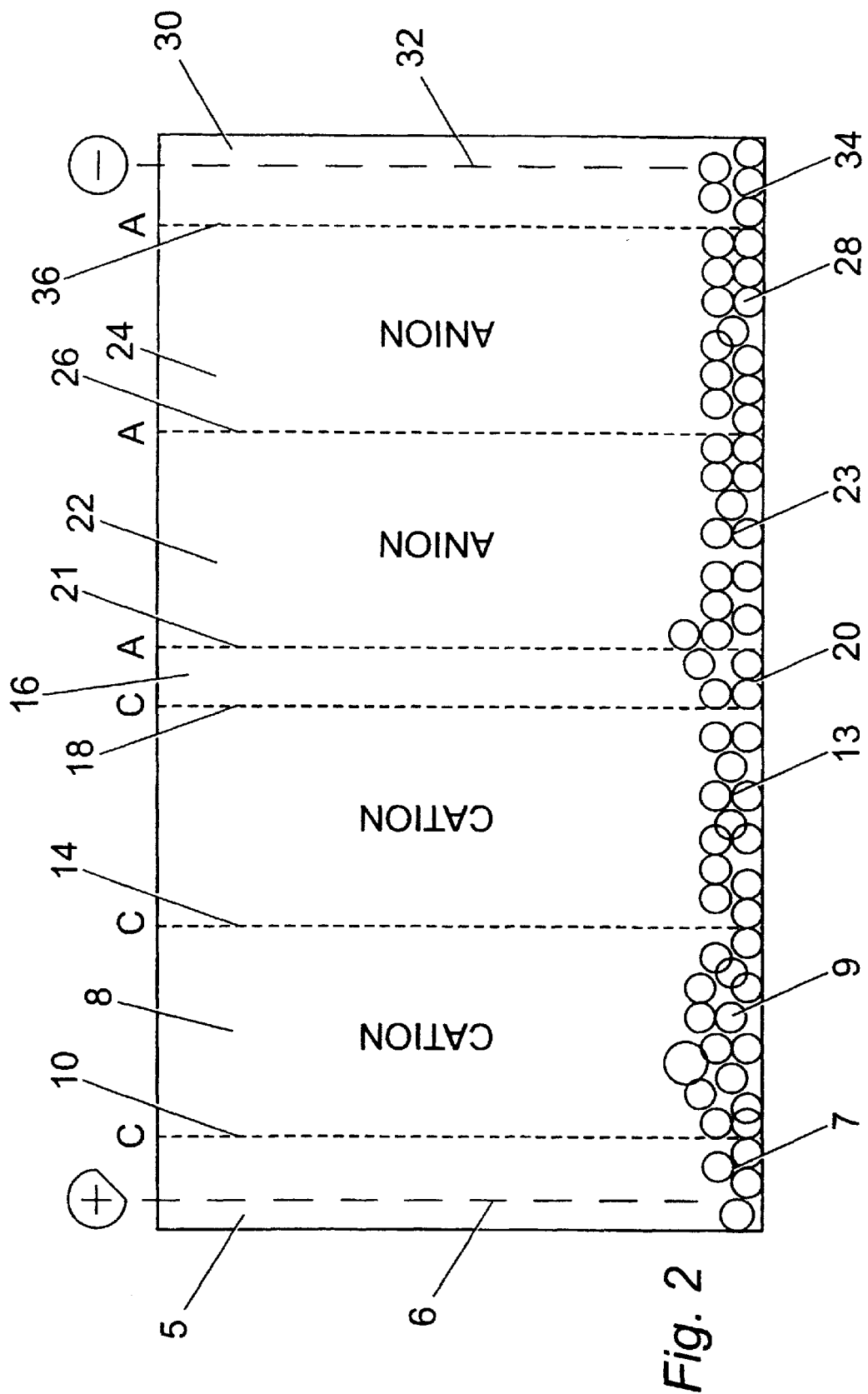
FIG. 2 is a schematic side view of the stack in FIG. 1.

In FIGS. 1 and 2, those chambers housing an anion exchange material have been labelled "ANION", whilst those chambers housing cation exchange material have been labelled "CATION". Also, the cation exchange membranes have been headed by the letter "C", whilst the anion exchange membranes have been headed by the letter "A".

The chambers of the stack (2), and its internal configuration is shown in greater detail in FIG. 2.

In the Example shown in FIGS. 1 and 2, the third and fifth chambers (12,22) may act to provide the first deionising flow path, whilst the second and sixth chambers (8,24) act to provide the second deionising flow path.

As shown in FIG. 1, feed water, such as from a Reverse Osmosis unit, is fed into the fifth anion exchange material chamber (22), and subsequently into the third cation exchange material chamber (12). As is known in the art, when a potential difference is applied across the anode (6) and cathode (32), anionic impurities in the feed water migrate into the fourth central concentrating chamber (16) through the relevant anion exchange membrane (21), whist cationic impurities present in the water as it passes though the third chamber (12) will migrate into the central concentrating chamber (16) though the interposed cation exchange membrane (18). The outflow (40) from the first deionising path is then passed into the holding tank (4). From the holding tank (4), preferably sized so as to accommodate a relatively large volume of water from the outflow (40) of the first deionising flow path over time, purified water could be drawn directly for use through a first tap (42).

Meanwhile, water in the holding tank (4) is drawn (by a pump not shown) into the second deionising flow path formed by the sixth and second chambers of the stack (24,8). The outflow (44) from the second flow path will be of higher quality than water stored in the holding tank (4), and is immediately available for use through a second tap (46). Where such second outflow (44) is not immediately required, this outflow (44) can be returned to the holding tank (4). The inflow to the tank (4) of such re-purified water will inherently increase or maintain the purity of the water in the holding tank (4).

Whilst the directions of flow in FIG. 1 show the water to be purified passing first through an anion exchange material chamber and subsequently through a cation exchange material chamber, this order of flow is not limiting. However, this order of flow is preferred as the permselectivity of cation exchange membranes is usually better than the permselectivity of anion exchange membranes, due to the generally larger size of undesired anions usually present in water to be purified.

As also shown in FIG. 1, a fluid, generally water, for the flushing streams through the anode chamber (5), the cathode chamber (30) and the concentrating chamber (16) is drawn from the outflow (44) of the second deionising flow path. The flushing stream water passes successively through the anode chamber (5), the cathode chamber (30) and the concentrating chamber (16). Thus, the most purified flushing stream water passes countercurrently to the final part of the second deionising flow path through the cation exchange material chamber (8). The flushing stream through the cathode chamber (30) is also arranged to flow countercurrently to the flow through the first deionising flow path anion exchange material in the sixth chamber (24).

The apparatus and method of the present invention may be used in combination with any water purification system and/or other water purification apparatus.

The recirculation of water from the holding tank through the second deionising flow path may be operated continuously in order to maintain the highest possible purity of water in the holding tank. Alternatively, the recirculation may be operated intermittently, in order to maintain the purity of water in the holding tank above a predetermined threshold. The flow of water through the first deionising flow path may also be continuous. Preferably, the flow of water through the first deionisation flow path is controllable by one or more volume or level switches in the tank in order to maintain a desired volume in the holding tank without overflow when water is not being drawn off for use.

Because of the expected more continuous operation of the secondary circulation of the deionising flow path, there will be greater or continuous regeneration of the anion and cation exchange materials in the third and fifth chambers providing the first deionisation flow path, especially when water is not flowing therethrough. Thus, it is expected that the exchange materials in the first deionising flow path will have greater capacity for removing ions from water to be purified as and when required.

The separation of the first and second flow paths reduces the back pressure ($\Delta P$) of the stack to both flows. This reduction in $\Delta P$ on the first flow path increases the feed flow and quality when the stack is fed with RO permeate. The reduction in $\Delta P$ on the second flow path increases the potential flow that is available as output.

Reverse Osmosis permeate typically has a conductivity of 20 $\mu$S/cm, and the BSI, ASTM and NCCLS laboratory water grades are usually set at 1 and 0.1 $\mu$S/cm. The prior art straight-through units can provide water of high purity, eg. less than 0.1 $\mu$S/cm, which could be provided into a tank. However, as mentioned before, absorption of any impurities either from the tank or from the environment will reduce the quality of the water significantly, and the conductivity of such water has often been found to be greater than 1 $\mu$S/cm after even a short period of time.

Apparatus as shown in FIG. 1 was tested, with the stack reaching 3.15 amps at 13.7 volts, and a resistance of only 4.4 ohms. The following table details the quality of water found at the various stages of the stack.

TABLE 1

| Stream | RO permeate to first deionising path | Stream exiting first deionising path | Tank/feed to second deionising path | Stack concentrate | Product from second deionising pass | Take off |
|---|---|---|---|---|---|---|
| Operation | as required | as required | continuous | continuous | continuous | intermittent |
| Flow-rate 1 h$^{-1}$ | 42 | 42 | 97 | 6 | 91 | 30 |
| Quality | 37 $\mu$S/cm | 2–3 $\mu$S/cm | 1 $\mu$S/cm | 150 $\mu$S/cm | 0.067 $\mu$S/cm | 0.067 $\mu$S/cm |

As can be seen, the water in the tank can be maintained at or below a conductivity of 1 $\mu$S/cm, whilst the dispensed product water available directly from the second outflow has a conductivity of less than 0.1 $\mu$S/cm.

Figure 3:
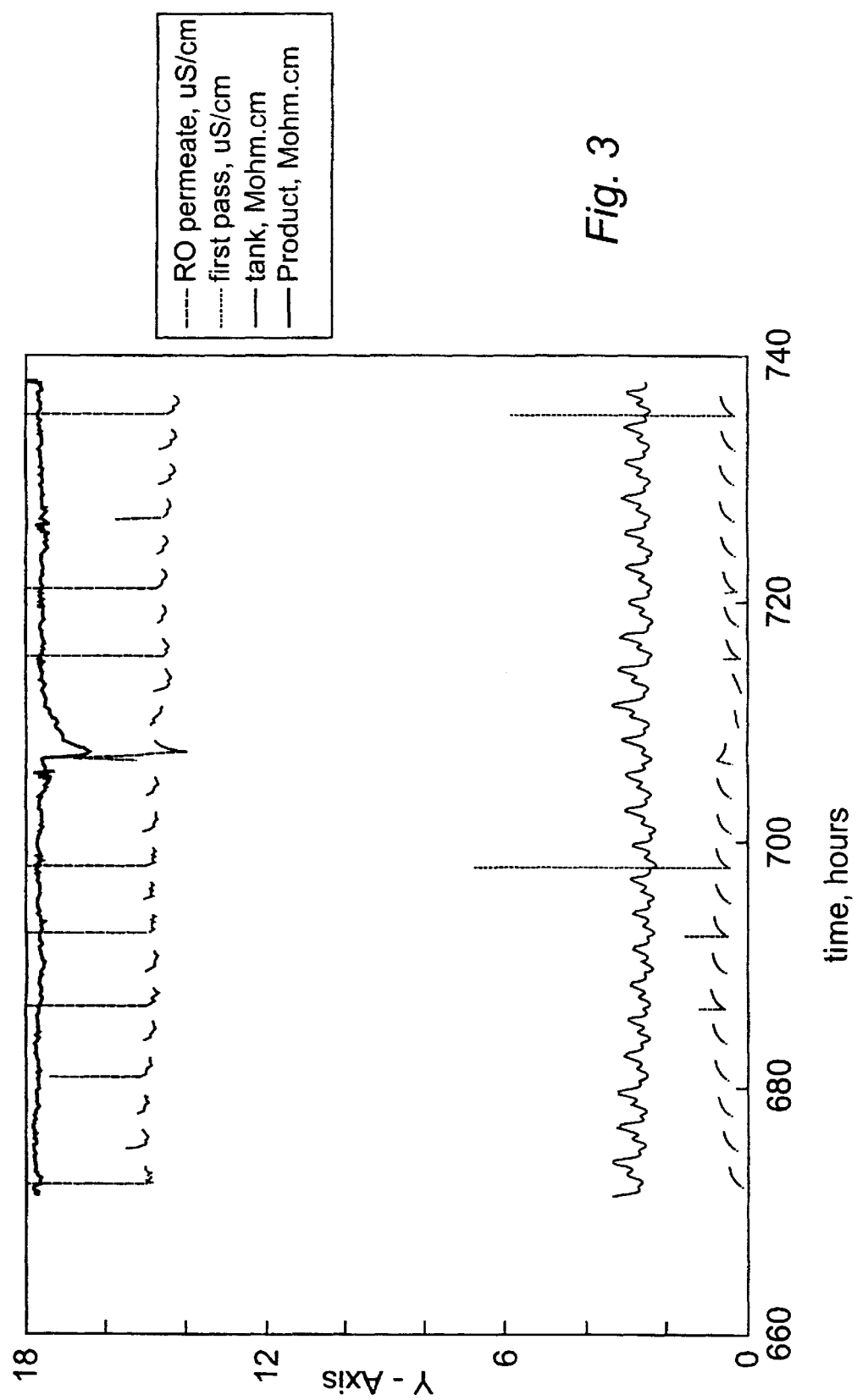
FIG. 3 is a graph showing a pilot unit operation of the apparatus in FIG. 1.

FIG. 3 shows the values of this pilot operation between 660 and 740 hours of running.

The present invention provides an integral apparatus and method able to supply purified water at a very low conductivity. Purified water at a still significantly low conductivity, and in greater volume, is also available from the holding tank directly. The present apparatus requires the use of only a single pair of electrodes and hence one power supply. Moreover, the ion exchange materials in the first deionising flow path can be regenerated when water is not flowing through them such that they have a greater capacity for deionisation when required. such that they have a greater capacity for deionisation when required.

What is claimed is:

1. An electrodeionisation apparatus having an anode and a cathode and comprising a first deionising flow path for water to be purified through an anion exchange material and/or a cation exchange material, in either order where both materials are used, and an integral second deionising flow path through an anion exchange material and a cation exchange material, in either order, wherein the outflow from the first path is held in a holding tank prior to passage through the second flow path, and the outflow from the second path is available for use.

2. Apparatus as claimed in claim 1 wherein the second path outflow is partly or fully returned to the holding tank.

3. Apparatus as claimed in claim 1 wherein water in the holding tank is separately made available for use.

4. Apparatus as claimed in claim 1 wherein the anion exchange material is an anion exchange resin.

5. Apparatus as claimed in claim 1 wherein the cation exchange material is a cation exchange resin.

6. Apparatus as claimed in claim 1 wherein the exchange materials are held in separated chambers.

7. Apparatus as claimed in claim 1 wherein the first deionising flow path involves both an anion exchange material and a cation exchange material in either order.

8. Apparatus as claimed in claim 1 wherein the anode is housed within a chamber housing anion exchange material.

9. Apparatus as claimed in claim 1 wherein the cathode is housed within a chamber housing cation exchange material.

10. Apparatus as claimed in claim 1 wherein the anode is housed in a chamber separate from the first and second deionising flow paths.

11. Apparatus as claimed in claim 1 wherein the cathode is housed in a chamber separate from the first and second deionising flow paths.

12. Apparatus as claimed in claim 1 wherein the anode and/or cathode are not separate from either the first and/or second deionising flow paths.

13. Apparatus as claimed in claim 1 wherein the chamber for any anion exchange material of the first deionising flow path is adjacent the chamber for the anion exchange material for the second deionising flow path, and the chamber for any cation exchange material of the first deionising flow path is adjacent the chamber for the cation exchange material for the second deionising flow path.

14. Apparatus as claimed in claim 1 wherein the water to be purified or further purified passes through an anion exchange material first, followed by passage through a cation exchange material.

15. Apparatus as claimed in claim 1 wherein the apparatus includes a concentrating chamber.

16. Apparatus as claimed in claim 15 wherein the concentrating chamber is centrally arranged.

17. Apparatus as claimed in claim 15 wherein the concentrating chamber has a flushing stream passing therethrough to remove electrode gases and/or unwanted ions.

18. Apparatus as claimed in claim 1 wherein the anode is housed within an anode chamber, the cathode is housed within a cathode chamber, and at least one of the anode chamber and cathode chamber has a flushing stream passing therethrough.

19. Apparatus as claimed in claim 18 wherein purified and/or repurified water from the first and/or second flow paths could be used for the or each flushing stream.

20. Apparatus as claimed in claim 19 wherein one or more of the flushing streams run countercurrent to the water flow through an adjacent purified water chamber.

21. Apparatus as claimed in claim 1 wherein the apparatus comprises a stack.

22. Apparatus as claimed in claim 21 comprising seven chambers, a first chamber housing the anode, a second chamber containing cation exchange material for the second deionisation flow path, a third chamber housing cation exchange material for the first deionising flow path, a fourth chamber being a central concentrating chamber, a fifth chamber housing anion exchange material for the first deionising flow path, a sixth chamber housing anion exchange material for the second deionising flow path, and a seventh chamber housing the cathode.

23. Apparatus as claimed in claim 22 wherein the chambers are separated by perm-selective membranes.

24. Apparatus as claimed in claim 1 adapted to provide water in the holding tank at or below a conductivity of 1 $\mu$S/cm and a dispensable product water available directly from the second outflow at a conductivity of less than 0.1 $\mu$S/cm.

25. A method of providing a volume of purified water immediately available for use, wherein the water to be purified is passed through a first deionising flow path which includes flow through at least one electrodeionisation cell which deionises the water, and held in a holding tank from which it is available for use, and wherein water in the holding tank is intermittently or continuously circulated through a second flow path which includes flow through at least one electrodeionisation cell which deionises the water, and returned to the holding tank.

26. A method of providing purified water wherein water to be purified is passed through a first deionising flow path which includes flow through at least one electrodeionisation cell which deionises the water, followed by a passage through a second deionising flow path, wherein the outflow from the first path is held in a holding tank prior to passage through the second flow path, which includes flow through at least one electrodeionisation cell which deionises the water, and wherein the outflow from the second path is available for use.

27. A method as claimed in claim 26 wherein the second path outflow is partly or fully returned to the holding tank.

28. A method as claimed in claim 26 wherein the electrodeionisation apparatus of claim 1 is used.

29. A method as claimed in claim 26 wherein water in the holding tank is separately available for use.

30. A method as claimed in claim 26 wherein water is continuously recirculated from the holding tank through the second deionising flow path.

31. A method as claimed in claim 26 wherein water is intermittently recirculated from the holding tank through the second deionising flow path.

32. A method as claimed in claim 26 wherein the flow of water through the first deionisation flow path is controllable by one or more volume or level switches in the tank.

33. A method as claimed in claim 26 to provide water in the holding tank at or below a conductivity of 1 $\mu$S/cm and a dispensable product water available directly from the second outflow at a conductivity of less than 0.1 $\mu$S/cm.

34. Apparatus for providing a volume of purified water available immediately for use, comprising a first deionising flow path for water to be purified through an electrodeionisation cell in which deionization occurs through an anion exchange material and/or a cation exchange material, in either order where both materials are used, and an integral second deionising flow path through an electrodeionisation cell in which deionization occurs through an anion exchange material and a cation exchange material, in either order, wherein the outflow from the first path is held in a holding tank adapted to hold the volume of purified water, and wherein means are provided to intermittently or continuously circulate water in the holding tank through the second flow path and wholly or partly returned to the holding tank.

* * * * *